No. 882,994. PATENTED MAR. 24, 1908.
G. P. CAMPBELL & F. H. RINGEMANN.
AIR FORCING MEANS FOR A GAS GENERATOR.
APPLICATION FILED APR. 1, 1904.
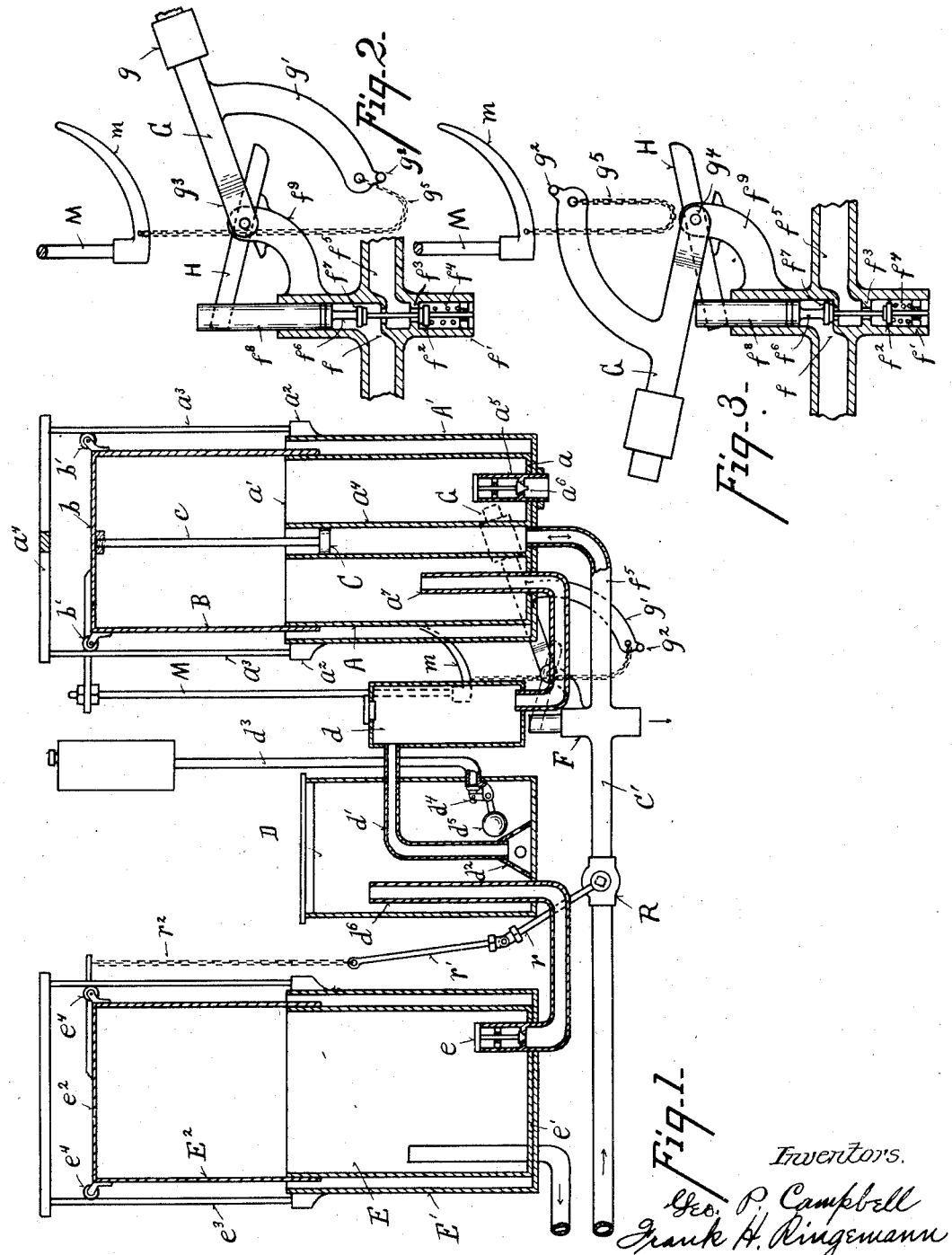

UNITED STATES PATENT OFFICE.

GEORGE P. CAMPBELL AND FRANK H. RINGEMANN, OF CINCINNATI, OHIO.

AIR-FORCING MEANS FOR A GAS-GENERATOR.

No. 882,994.      Specification of Letters Patent.      Patented March 24, 1908.

Application filed April 1, 1904. Serial No. 201,035.

*To all whom it may concern:*

Be it known that we, GEORGE P. CAMPBELL and FRANK H. RINGEMANN, citizens of the United States of America, and residents of Cincinnati, county of Hamilton, State of Ohio, have invented certain new and useful Improvements in Air-Forcing Means for a Gas-Generator, of which the following is a specification.

The object of our invention is a generator which will manufacture gas automatically at a rate that is in direct proportion to the rate at which the gas is being utilized at any time and in which the gas produced is uniform in character.

In the accompanying drawings Figure 1 is a longitudinal sectional view taken through the apparatus embodying our invention. Fig. 2 is an enlarged view of the valve for regulating the supply of water for actuating the air tank, showing it in the position it occupies when water is being supplied to raise the piston of the air tank. Fig. 3 is a similar view, but showing the parts in the position they occupy after the piston has been raised, showing the supply of water cut off from the tank and the same opened to the discharge.

In our generator the gas is produced by passing air through a volatile liquid carrying the air laden with vapor to a gas tank, from which the gas may be drawn in quantities as desired. The air is supplied from an air reservoir, in which the air is stored by means of hydraulic pressure, the pressure being regulated by the quantity of gas in the gas tank.

The air reservoir consists of a lower cylindrical vessel, A, having a bottom, $a$, and an open top, $a'$. Surrounding the vessel, A, is a similar cylindrical vessel, A', which at its upper end has brackets, $a^2$, which support vertical standards, $a^3$, which are connected together at their upper ends by a spider, $a^4$. Over vessel, A, an inverted cylindrical vessel, B, is fitted to slide, whose end, $b$, is closed and carries journal wheels, $b'$, to engage the rods, $a^3$, to steady the vessel, B, in its reciprocation. Vessel, A, has a central cylindrical vertical casing, $a^4$, within which slides a piston, C, the piston being connected by a piston rod, $c$, with the top, $b$, of the vessel, B. The piston is actuated by water from the pipe, $c'$. Tank, A, has passing through its walls a valve casing, $a^5$, within which is a gravity valve, $a^6$, which is raised by the atmospheric pressure when the vessel, B, is carried upward to admit air into the air reservoir, and which closes when the vessel, B, is descending to force the air out through pipe, $a^7$, to the fluid tank, D. In passing from the air reservoir to the fluid tank, the air goes through an air filter, $d$, to be cleansed from impurities. From the air filter the air passes through a pipe, $d'$, to the bottom of the fluid tank, which has a funnel, $d^2$, for spreading the air to pass it upward through the fluid tank, D. The fluid is supplied from a pipe, $d^3$, which has at its lower end a valve, $d^4$, controlled by a float, $d^5$, which opens the valve to allow fluid to pass into the fluid tank, D, whenever the fluid has fallen below a certain point, and closes the valve again when the fluid has risen to a certain point. The air after having passed through the fluid into the top of the tank, D, charged with the vapors, passes through a pipe, $d^6$, raising valve, $e$, and into the gas reservoir, which consists of a lower cylindrical vessel, E, closed at its bottom, $e'$, surrounded by a similar vessel, E', and an upper cylindrical vessel, $E^2$, closed at its upper end, $e^2$, and fitting snugly over the vessel, E. Vessel, E', carries standards, $e^3$, which are engaged by wheels, $e^4$, upon the upper end of vessel, $E^2$.

We will now describe the means by which the supply of water for raising the tank, B, for charging the air reservoir is cut off from the same, and the water in the casing, $a^4$, is discharged. Located in the water supply pipe, $c'$, is a valve, F, whose casing has a central horizontal diaphragm, $f$, in which is formed a valve seat. Below the diaphragm, $f$, is a way, $f'$, leading to the discharge, which is controlled by a valve, $f^2$, seating upward against a valve seat, $f^3$, by a coiled spring, $f^4$. Upon the side of the valve is a channel, $f^5$, leading into the casing, $a^4$. Valve, $f^2$, has a valve stem, $f^6$, upon which above diaphragm, $f$, is located a valve, $f^7$, and which terminates in a piston head, $f^8$. When valve, $f^7$, is seated against the diaphragm, $f$, to close off communication between the water supply pipe, $c'$ and the casing, $a^4$, the valve, $f^2$, is carried downward from its seat to open the communication between the discharge, $f'$, and the casing, $a^4$. The means by which the piston head, $f^8$, is actuated to open the casing, $a^4$, to the discharge opening after the air reservoir has been charged with air, to permit the vessel, B, to move downward to force the water through the fluid in fluid tank, D, is as follows:

Projecting upward from casing, F, is a bracket, $f^9$, in which is pivoted a lever arm, G, which carries at its outer end a weight, $g$, and an outwardly projecting arm, $g'$, which carries at its outer end a pin, $g^2$. The arm, G, at its inner end, $g^3$, is bifurcated and between the bifurcated ends a rod, H, is pivoted upon a pivot pin, $g^4$, and at its outer end the rod, H, is coupled to the piston head, $f^8$. The arm, $g'$, is connected by means of a chain, $g^5$, with a journal rod, M, which is connected to the tank, B. Rod, M, carries at its lower end a cam shaped arm, $m$, in whose path the pin, $g^2$, stands when the arm, G, has been carried to position shown in Fig. 3. When the vessel, B, is carried upward, the chain, $g^5$, rotates the arm, G, upward around the pivot, $g^4$. After the arm, G, in its upward motion has passed the vertical position, the weight, $g$, carries it downward and causes the arm, G, to strike the piston head, $f^8$, as shown in Fig. 3, and to carry valve stem, $f^6$, downward, closing the valve, $f^7$, against the diaphragm, $f$, and opening the valve, $f^2$, to allow the water to discharge from the casing, $a^4$. The weight of the vessel, B, which may be supplied with weights to the amount desired, then carries it downward. On its downward movement the arm, $m$, contacts the pin, $g^2$, forces the arm, G, back to the position shown in Fig. 2, at which time the spring, $f^4$, carries the valve rod, $f^6$, upward, closes the valve, $f^2$, and carries the valve, $f^7$, upward, opening the communication between the water supply $c'$, and the casing, $a^4$, so that water may be again admitted to it to raise the piston, C.

The means by which the supply of water to the pipe, $c'$, is regulated, is as follows: Located in the supply pipe, $c'$, is an ordinary two way valve, R, which is connected to a rod, $r$, which is pivoted to a link, $r'$, whose outer end is connected by a chain, $r^2$, to the top of vessel, $E^2$. When the vessel, $E^2$, is carried to the upper limit of its travel by the pressure of gas from the tank, D, rod, $r$, is rotated, closing valve, R, and cuts off the supply of water to the pipe, $c'$. The vessel $E^2$, is lowered by drawing off gas from the gas reservoir, the rod, $r$, is rotated downwardly, opening up valve, R, to supply water to the pipe, $c'$.

In operation it is seen that since the vessel, B, cuts off the pressure of the water after the vessel has reached a predetermined height, the pressure of the air in the air reservoir never exceeds that of the weight of the vessel, and therefore the force with which the air is carried through the volatile fluid is uniform and the character of the gas will be likewise uniform. It is likewise obvious that the generator is automatic in its action throughout, that as the supply of gas is drawn off from the gas reservoir, it actuates the water valve which admits water to the air reservoir to raise the same to supply more air to the volatile fluid and thereby to generate more gas to take the place of that being utilized.

What we claim is:

An air forcing means consisting of a stationary vessel closed at its lower end and open at its upper end and a second vessel open at its lower end and closed at its upper end and telescoping into the lower vessel in combination with a piston cylinder, a piston within the cylinder whose reciprocation actuates the movable vessel of the air reservoir, a water supply pipe for admitting water under pressure to the piston cylinder for actuating the piston and a valve for regulating the supply of water to the piston cylinder consisting of a valve casing having a discharge opening and a channel leading into the piston cylinder, a valve for regulating the opening and closing of the channel and the opening and closing of the discharge, whose valve stem extends beyond its valve casing, an arm pivoted adjacent to the water valve and carrying a weight at its outer end, means for coupling it to the upper vessel of the air reservoir whereby the raising of the vessel throws the arm in contact with the valve stem actuating it to open the discharge and close off the supply of water to the piston cylinder and the lowering of the vessel actuates the arm to close the discharge and open the supply to the piston cylinder, substantially as shown and described.

GEORGE P. CAMPBELL.
FRANK H. RINGEMANN.

Witnesses:
W. F. MURRAY,
A. McCORMACK